Mar. 13, 1923.
C. E. HARRIS.
CONVERTIBLE VEHICLE WHEEL.
FILED FEB. 18, 1922.
1,448,591.
2 SHEETS—SHEET 1.
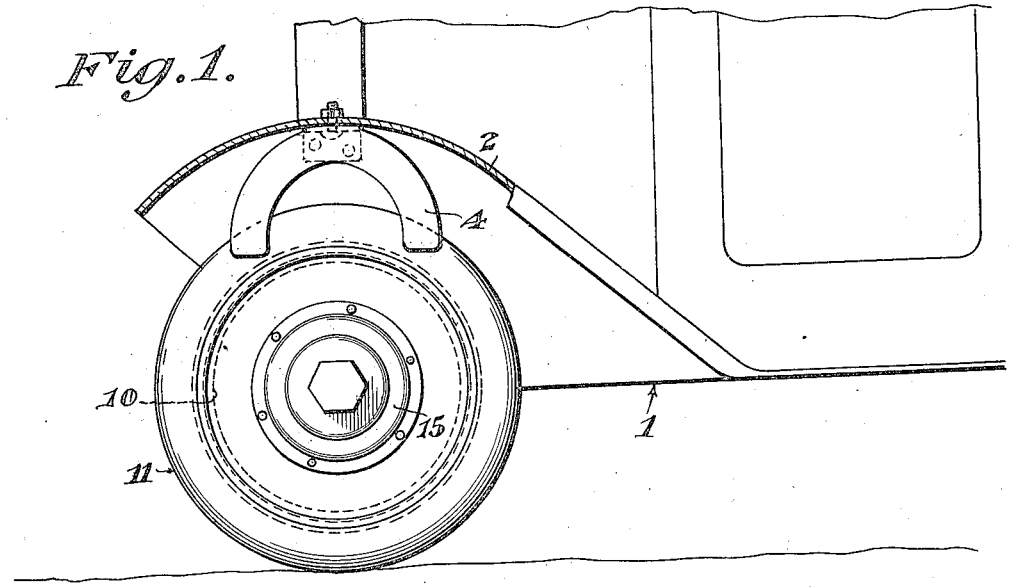
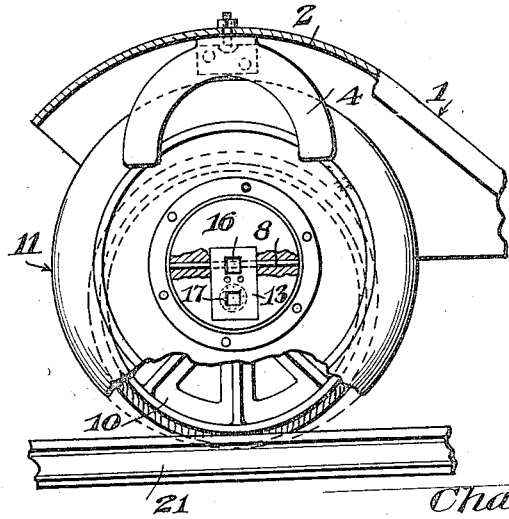
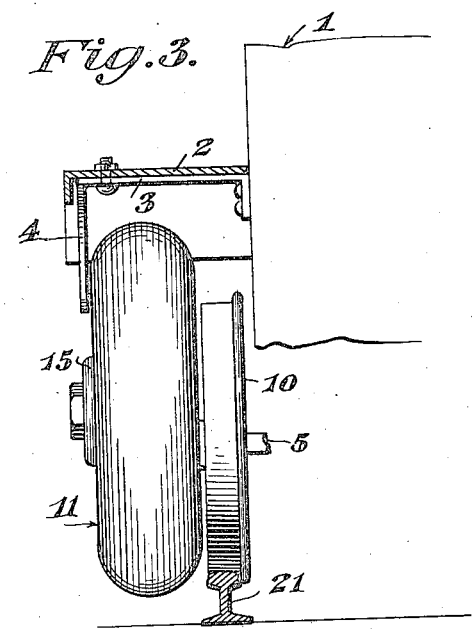
Chauncey E. Harris, INVENTOR.
BY Geo. F. Kimmel, ATTORNEY.

Mar. 13, 1923.
C. E. HARRIS.
CONVERTIBLE VEHICLE WHEEL.
FILED FEB. 18, 1922.
1,448,591.
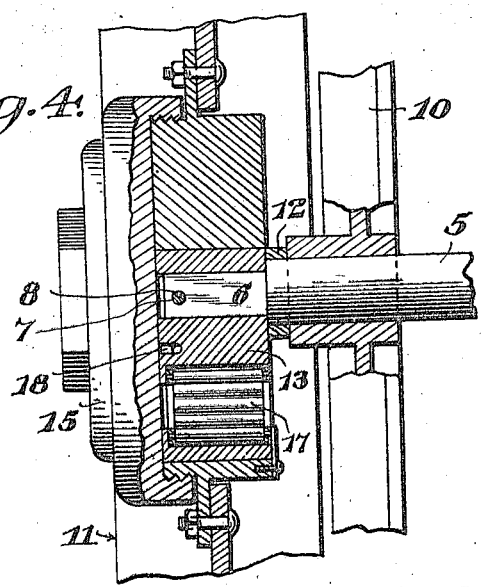
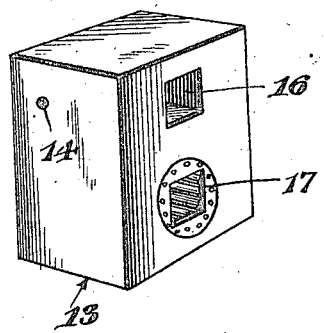
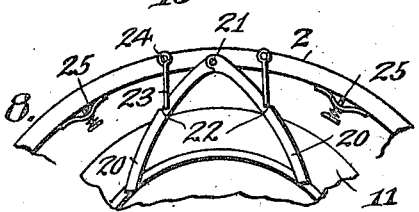
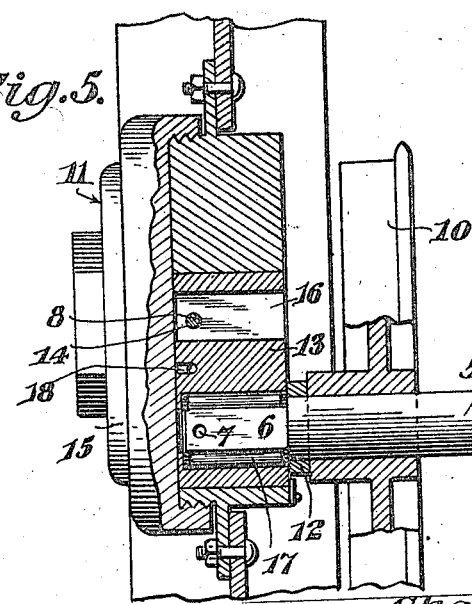
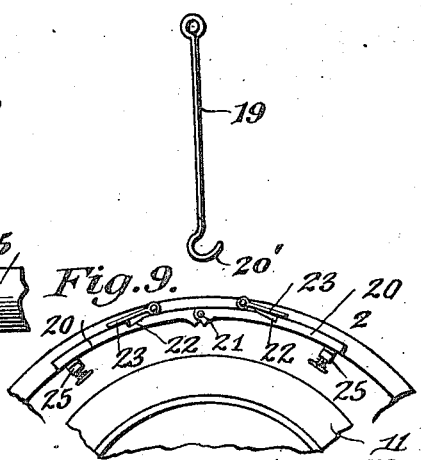
Chauncey E. Harris, INVENTOR.
BY Geo. P. Kimmel, ATTORNEY.

Patented Mar. 13, 1923.

1,448,591

UNITED STATES PATENT OFFICE.

CHAUNCEY EVERETT HARRIS, OF NASHUA, NEW HAMPSHIRE.

CONVERTIBLE VEHICLE WHEEL.

Application filed February 18, 1922. Serial No. 537,546.

*To all whom it may concern:*

Be it known that I, CHAUNCEY EVERETT HARRIS, a citizen of the United States, residing at Nashua, in the county of Hillsborough and State of New Hampshire, have invented certain new and useful Improvements in Convertible Vehicle Wheels, of which the following is a specification.

This invention relates to convertible vehicle wheels adaptable for use on either roadways or tracks.

The object of the invention is to construct a wheel of this character which may be readily changed for one use or the other without jacking it up or changing the tire.

Another object is to provide a single shaft carrying a flanged track wheel and a rubber tired road wheel equipped with simple and easily changeable means whereby the tread of the desired wheel may be positioned for contact with the surface on which the wheel is to travel.

Another object is to provide a structure of this character in which one of the wheels turns always with the shaft while the other turns only when positioned for use.

With these and other objects in view, the invention consists in certain novel features of construction as hereinafter shown, described and claimed:

In the accompanying drawings:—

Figure 1 represents a side elevation of a wheel constructed in accordance with this invention shown applied.

Fig. 2 is a similar view showing the flanged track wheel engaged with the rail, the rubber tired wheel being broken out to disclose the flanged wheel and the hub cap removed to disclose the means for converting the wheel or rather for a change from one to the other.

Fig. 3 is a detail transverse section through a portion of the vehicle with the wheels shown in elevation and the track wheel engaged with a rail.

Fig. 4 is an enlarged detail sectional view showing the changeable means in use for connecting the rubber tired wheel to be turned with the axle.

Fig. 5 is a similar view showing the flanged track wheel in position for use and the rubber tired wheel mounted so as to be out of contact with the roadway.

Fig. 6 is a detail perspective view of the block used for changing the positions of the wheel relatively to each other.

Fig. 7 is a side elevation of a tool to be used in withdrawing the block when the wheels are to be changed.

Figs. 8 and 9 are fragmentary side elevations, partly in section, of modified forms of guard arms attached to the rim of the mud guard.

In the embodiment illustrated a motor vehicle 1 is shown which may be a truck or not and which is here shown with the usual fenders 2 for the wheels. The fender 2 carries a bracket 3 having a depending member 4 designed to be positioned next or adjacent to the outer face of the rubber tired wheel presently to be described to prevent the wheel from sliding off when changing from one wheel to the other.

This vehicle 1 is equipped with an axle 5 the body portion of which is shown round while the terminal is squared or made angular as shown at 6 for a purpose presently to be described. The squared terminal 6 of the axle has an aperture 7 extending transversely therethrough to receive a locking pin 8.

The flanged track wheel 10 is fixedly mounted on the axle 5 adjacent the squared terminal 6 thereof and this wheel rotates with the axle at all times whether the tread thereof be in engagement with a track or not.

A rubber tired road wheel 11 is carried by the squared or angular end 6 of the shaft 5 outside or in advance of the track wheel 10 and is spaced therefrom by a suitable washer 12. The wheel 11 may be of any suitable or desirable construction being here shown as a disc wheel and which has removably mounted therein a hub block 13, here shown rectangular in form and which fits in a correspondingly shaped opening at the center of the wheel 11 being removably held by the pin 8 which passes through an aperture 14 in said block and through the wheel hub, the pin being held in engaged position by a removable hub cap 15.

The rectangular hub block 13 has a square bore 16 extending through one end thereof which is shaped to correspond to the shape of the angular axle terminal 6 and is designed to receive said terminal when the rubber tired wheel is to be used. This block 13 also has a roller bearing socket 17 arranged in its other end in radial alinement with the opening 16 and which is designed to receive axle 5 and support the wheel 11 to hold the tread thereof out of contact with the roadway when the wheel 10 is used. The front face of the block 13 is also provided with a sunken loop 18 to be engaged by the hook or bill 20' of an implement 19 for removing the block as will be presently more fully described.

In the use of this wheel or wheels when the rubber tired wheel 11 is in use with its tread engaged with the roadway as is shown clearly in Fig. 1, the vehicle is driven on to the track rails shown at 21 with the flanged wheels 10 engaging said rails. The hub caps 15 are then removed from the wheels 11 which unlock the pins 8 and permit them to be withdrawn. After these pins have been withdrawn the blocks 13 are removed by inserting the tool 19 in the counter sunk loop 18. The wheel 11 is then lifted and the block 13 again inserted with the ball bearing socket 17 thereof engaged with the axle end 6. The pin 8 is then replaced and the hub cap 15 restored to its normal position, as is shown clearly in Fig. 5. When the axle is in the elevated position it is located in the socket 16 and secured by the pin 8. The block 13 and the wheel 11 rotate with the axle. When the wheel 11 is mounted on the anti-friction bearing 17, said bearing 17, and wheel 11, do not rotate except about the axis of the axle. The block 13 is held stationary by engagement with the guard arms 20, against the wheel 11 then in position to hold the wheel against rotation as shown in Fig. 8, the arms 20 bearing with sufficient friction against the tire to prevent the wheel 11 from rotating.

In Fig. 7 guard arms 20 are mounted on a common pivot bolt 21 carried by the rim portion of the mud guard 2 and each arm has a notch 22 therein in which engages a respective catch finger 23 pivotally hung on a pin 24 carried by the edge of the mud guard 2.

When the catch fingers engage the arms 20 they lock and hold these arms in position against the wheel 11 and hold the wheel frictionally from rotation.

When the arms 20 are not in use the catch fingers 23 are lifted from the notches 22 permitting the arms 20 to be swung upwardly from engagement with the wheel 11 and against the rim 2 where they engage and are held by spring-held catch-buttons 25, as shown in Fig. 9 until again needed.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

1. A vehicle having road and track wheels equipped with means for raising or lowering one of said wheels whereby either may be used for traveling at the will of the operator.

2. A vehicle having an axle with track and road wheels mounted thereon, one of said wheels being permanently mounted on said axle and the other connected for vertical adjustment relative to the fixed wheel to provide for the positioning of the tread of one or the other at the will of the operator.

3. A vehicle having an axle with track and road wheels mounted thereon, one of said wheels being permanently mounted on said axle and the other having a removable block with radially spaced axle receiving openings whereby said wheel may be raised or lowered to position its tread below or above that of the other wheel at the will of the operator.

4. A vehicle having an axle with track and road wheels mounted thereon, one of said wheels being permanently mounted on said axle and the other having a removable block with radially spaced axle receiving openings whereby said wheel may be raised or lowered to position its tread below or above that of the other wheel at the will of the operator, one of said openings having means for fixedly connecting said wheel to rotate with the axle and the other equipped to permit the axle to turn within the wheel without rotating it.

5. A vehicle having an axle with track and road wheels mounted thereon, the road wheel being on the outer end of the axle and the track wheel adjacent to the inner face thereof on said axle, said track wheel being fixedly mounted to turn with the axle, a removable block carried by the road wheel and having radially spaced axle receiving openings therein, the innermost of which is shaped to fit the axle end to adapt the wheel to turn with the axle and when engaged thereby to position the tread of the wheel below that of the track wheel, the other axle receiving opening being provided with roller bearings to permit the axle to rotate therein without affecting said wheel when so supported being positioned above the track wheel out of contact with the surface over which the vehicle travels.

6. A vehicle having an axle with track and road wheels mounted thereon, one of said wheels being permanently mounted on said axle and the other having a removable block mounted therein, said block having radially spaced axle receiving openings, and a pin extending through said block and one of said openings and adapted to pass through the axle when in said opening whereby the wheel is secured to the axle and the block to the wheel.

In testimony whereof, I affix my signature hereto.

CHAUNCEY EVERETT HARRIS.